July 15, 1947.  L. HAMMOND  2,423,885
RADIANT ENERGY DETECTING APPARATUS
Filed Feb. 3, 1941  6 Sheets-Sheet 1
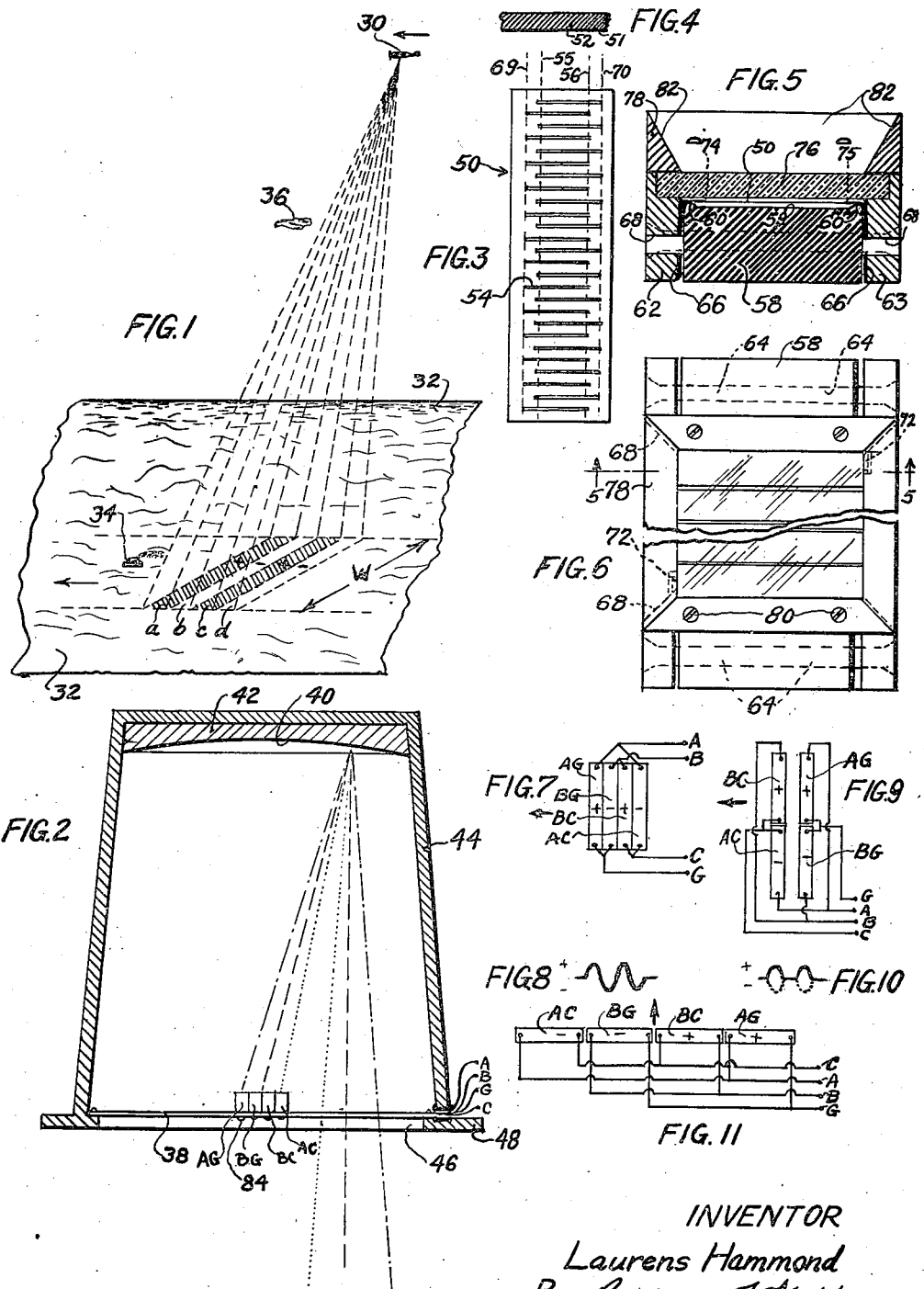
INVENTOR
Laurens Hammond
By Benjamin F. Nupper
ATTY.

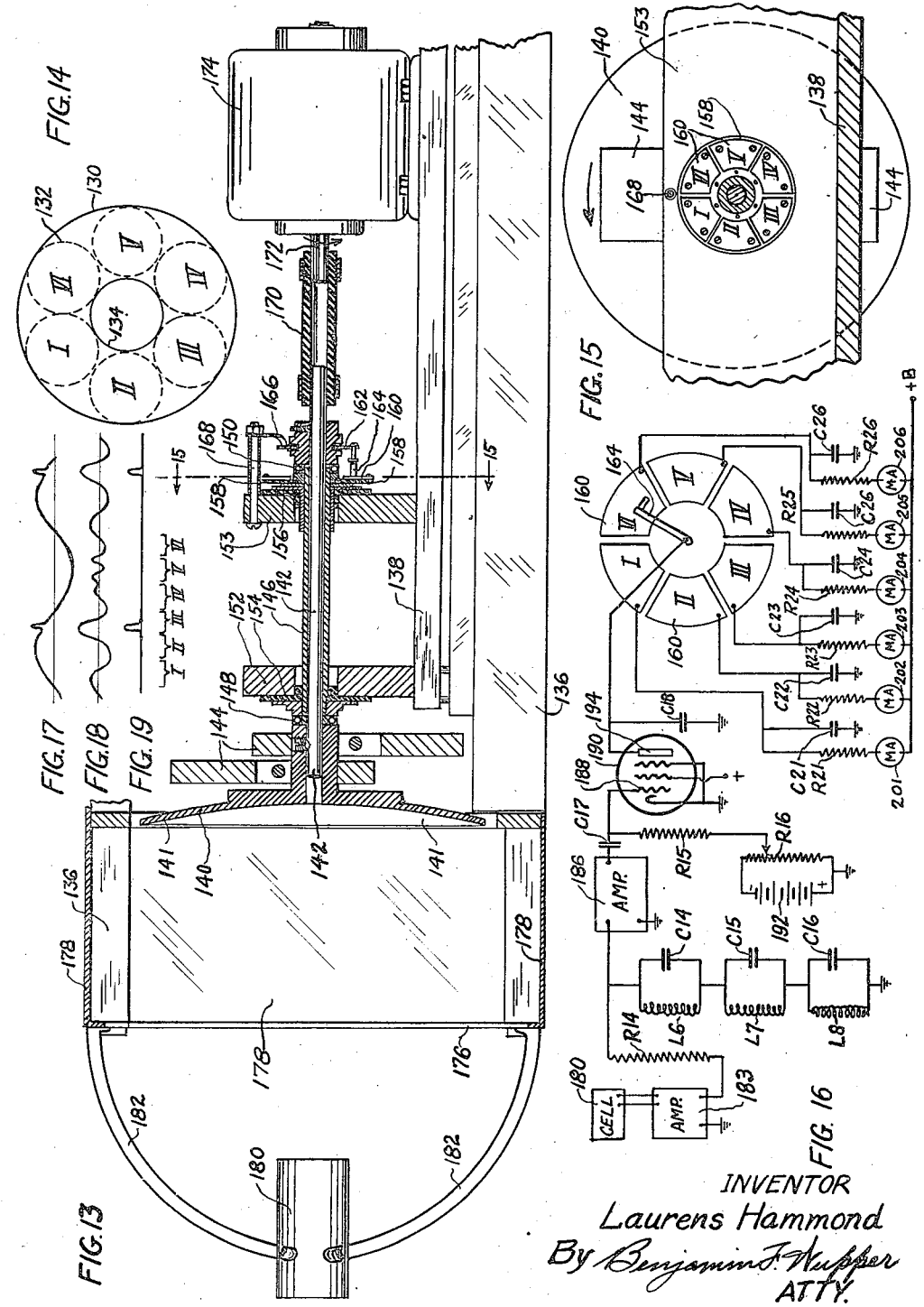

July 15, 1947.    L. HAMMOND    2,423,885
RADIANT ENERGY DETECTING APPARATUS
Filed Feb. 3, 1941    6 Sheets-Sheet 4

INVENTOR
Laurens Hammond
By Benjamin F. Wupper
ATTY.

July 15, 1947.                L. HAMMOND                2,423,885
RADIANT ENERGY DETECTING APPARATUS
Filed Feb. 3, 1941          6 Sheets-Sheet 5

INVENTOR
Laurens Hammond
By Benjamin F. Wupper
ATTY.

July 15, 1947.  L. HAMMOND  2,423,885
RADIANT ENERGY DETECTING APPARATUS
Filed Feb. 3, 1941   6 Sheets-Sheet 6

Inventor
Laurens Hammond
By Benjamin F. Nupfer
Atty.

Patented July 15, 1947

2,423,885

UNITED STATES PATENT OFFICE 2,423,885

RADIANT ENERGY DETECTING APPARATUS

Laurens Hammond, Chicago, Ill.

Application February 3, 1941, Serial No. 377,191

12 Claims. (Cl. 250—83.3)

My invention relates generally to radiant energy detecting apparatus, and more particularly to apparatus for detecting infrared radiation as well as radiation in the visual spectrum.

In its broader aspects, the invention contemplates the provision of apparatus whereby radiation, including the infrared and visual spectra from a source of such radiation, may be detected and the source thus located. As a specific example, the apparatus of my invention may be used to detect the presence of and accurately locate ships at sea either during daylight, at night, or under conditions when the visibility due to haze, light fogs, chemical smoke screens, etc., render the ship invisible. As a further specific example, the invention contemplates the provision of a dirigible aerial torpedo which is automatically directed to a target by apparatus responsive to visible or infrared radiation from the target.

It is thus an object of the invention to provide an improved detecting apparatus for locating sources of radiation including the infrared and visual spectra.

A further object is to provide improved scanning systems for apparatus of this character.

A further object is to provide an improved infrared ray responsive element or bolometer which will be very sensitive to infrared radiation, but which will be relatively non-microphonic and capable of withstanding vibration and shock.

A further object is to provide improved electrical filtering and amplifying circuits responsive to minute changes in resistance.

A further object is to provide an improved bridge circuit which is extremely sensitive to variations in the electrical characteristics of its component elements.

A further object is to provide an improved method of making bolometers.

A further object is to provide improved scanning apparatus which will cover a large area, which may, in effect, be "focused," and which will be efficient and sensitive in operation.

Other objects will appear from the following description, reference being had to the accompanying drawings in which:

Figure 1 is a diagrammatic perspective view illustrating one method of scanning;

Figure 2 is a central longitudinal sectional view of a fixed form of scanning apparatus;

Figure 3 is a plan view of an infrared radiation sensitive bolometer strip shown prior to forming it, to illustrate the method of making it;

Figure 4 is an enlarged fragmentary sectional view of the bimetal used in making the strip of Fig. 3;

Figure 5 is a transverse sectional view of a bolometer taken on the line 5—5 of Fig. 6;

Figure 6 is a plan view of a bolometer element;

Figure 7 is a diagrammatic view showing one arrangement of bolometer elements;

Figure 8 illustrates a wave of the form generated by the bolometer element arrangement of Fig. 7;

Figure 9 is a diagram showing a second form of bolometer element arrangement;

Figure 10 shows the two wave forms which may be generated by the bolometer arrangement of Fig. 9;

Figure 11 is a diagram illustrating a third form of bolometer element arrangement;

Figure 13 is a central vertical longitudinal sectional view of a modified form of scanning apparatus;

Figure 14 is a diagram illustrating the system of scanning employed by the apparatus of Fig. 13;

Figure 15 is a fragmentary transverse sectional view taken on the line 15—15 of Fig. 13;

Figure 16 is a wiring diagram showing the electrical detecting and amplifying circuits employed in connection with the scanning apparatus of Figs. 13, 14 and 15;

Figure 17 illustrates a wave form illustrating the type of signal generated in the bolometer using the scanning apparatus of Figs. 13 and 15;

Figure 18 shows the distorted wave form resultant from the use of the filtering system shown as part of the diagram of Fig. 16;

Figure 19 shows the wave ultimately produced in the output of the electrical circuit of Fig. 16;

Figure 12:
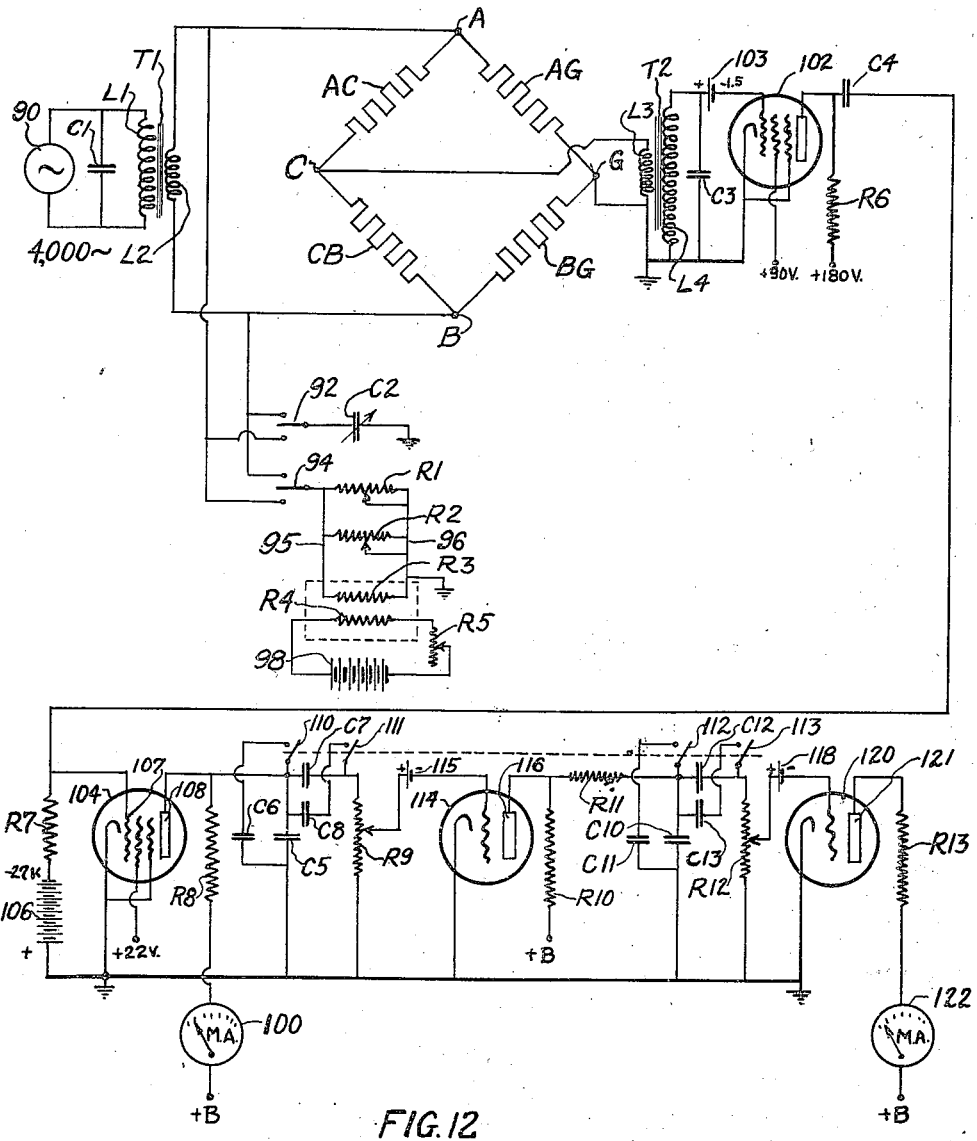
Figure 12 is a circuit diagram showing the electrical connections to the bolometer for amplifying and detecting signals caused by the bolometer.

As implied by the foregoing objects, the apparatus of the invention is particularly designed for two different purposes, namely, (a) to detect the presence of an enemy ship particularly at night or when visibility is poor, the apparatus being particularly adapted to be carried by an airplane, and (b) automatically to steer an aerial torpedo released by an airplane toward the target.

In fundamental principles, the problem of detecting the presence of a ship and of steering an aerial torpedo toward the ship are very similar, although for the first purpose the apparatus may of course be less complicated than for the latter purpose.

In connection with apparatus of this general character, particularly such apparatus as is responsive to infrared radiation, there are a number of practical considerations which affect the design of the apparatus.

Assuming that the source to be detected is a ship, its temperature may be higher or lower than that of the surface water surrounding it. For example, in winter the water will be warmer than the deck and superstructure of the ship which will usually be at or near the temperature of the atmosphere and thus colder than the water, whereas in summer, the superstructure will, generally speaking, be warmer than the water. The apparatus therefore must be responsive to temperature differences rather than merely to temperature increases.

Another consideration is that the sensitivity of the apparatus will increase as the area on the surface of the sea which is within the field of view of the apparatus approaches that of the radiation source, which hereinafter will be referred to as the "target." As the speed at which the field of view passes over the target increases, and hence the total area scanned in a given time unit increases, the energy available for detection by the apparatus decreases in inverse proportion, and hence in this respect requires that the apparatus be more sensitive. On the other hand, an increased speed of scanning may make it possible to increase the sensitivity of the apparatus because the apparatus may be made frequency responsive and thus more selective as to a signal of the desired frequency, and thus be affected less by spurious signals such as may be due to the vibration of the apparatus, to minor variations in the temperature of the water, to thermal agitation in the vacuum tube circuits, and generally to distinguish the signal from what is usually termed the "noise level," or "background noise."

The element initially responsive to the infrared radiation may be any one of a number of different forms, such, for example, as the cell shown in the patents to Hayes No. 1,954,204 or Hayes and Cram No. 654,630 or Hall No. 2,115,578. However, I prefer to use a bolometer of the type shown in Figs. 3 to 6 which is of improved sensitivity and is sufficiently rugged to withstand the shock and vibration to which it may be subjected.

The general principles of the operation of one form of scanning system will first be described by reference to Fig. 1. In Fig. 1, an airplane 30 is illustrated as flying at a relatively high altitude over the surface of a body of water 32, with the object of detecting the presence of a surface craft such as the ship 34. By means of apparatus, hereinafter to be described, the plane, in traveling in the direction of the arrow, scans a path of width W by infrared ray responsive or photoelectric apparatus having elemental portions receiving radiation from the alternately shaded and unshaded areas $a$, $b$, $c$ and $d$. If it be assumed that the elementary portions of the detecting apparatus receiving radiation from the areas $a$ and $c$ are capable of producing positive electrical impulses, and the elementary portions receiving radiation from the areas $b$ and $d$ are capable of generating a negative electrical impulse in the apparatus, it will be apparent that as the plane passes over the target, such as the ship 34, an electrical signal in the apparatus of two wave lengths and of generally sine wave form will be generated.

The rectangular areas $a$, $b$, $c$ and $d$ are preferably of a width approximating the maximum dimensions of the target. Assuming, for example, that the target is expected to be a ship in the order of 500 feet in length, the width of each of the areas $a$, $b$, $c$ and $d$ may be 500 feet. The length of each of the rectangular areas $a$, $b$, $c$ and $d$, or the width W of the strip scanned is, in practice, limited by the sensitivity of the apparatus and the difference in intensity of radiation of the target 34 and the surface. Practical considerations determined by calculation would appear to indicate that the lengths of the areas $a$, $b$, $c$ and $d$ should not be very many times greater than their widths, unless the difference in intensity of radiation from the target 34 and from the surface of the water is very great.

For purposes of illustration, the rectangular areas $a$, $b$, $c$ and $d$ are assumed to be approximately six times as long as they are wide. Assuming that the speed of the plane is 180 M. P. H., or three miles per minute, and assuming that the speed of movement of the target 34 is so small relative to the speed of the plane that it may be considered stationary, and assuming further that the widths of the rectangular areas $a$, $b$, $c$ and $d$ are 500 feet, it appears that it will take 1.894 seconds for one of the rectangular areas $a$, $b$, $c$ or $d$ to pass the target. The time required for two of these areas to pass the target would be 3.788 seconds, and the electrical wave generated in the detecting apparatus would thus have a frequency of .264 C. P. S. Therefore, if the plane maintains the proper altitude, a target upon the surface of the water will generate a signal having a frequency of exactly or very close to .264 C. P. S. Any object not on the surface of the water, such as a cloud 36 will not, in being scanned by the apparatus, generate a signal of the frequency of .264 C. P. S., but instead, a different frequency depending upon the altitude of the cloud. For example, if the cloud were one half way between the plane and the surface of the water, it would generate a frequency of .528 instead of .264 C. P. S. Thus, by making the detecting apparatus responsive to a given frequency and maintaining the plane at a given altitude, the apparatus may be made responsive to variations in intensity of radiation emanating from adjacent the surface of the water, and not responsive to variations in radiation emanating from sources located intermediate the plane and the water's surface.

The apparatus is thus in a sense "focused" upon the water's surface, the focal length being determined by the frequency to which the detecting apparatus is tuned. By various electrical and mechanical means, such tuning so as to make the apparatus critically responsive to a predetermined frequency, may be readily accomplished. Thus, for example, if the plane is flying at an altitude twice as great as that previously assumed, a target being scanned would produce a signal of one half the previous frequency, namely, .132 C. P. S. Naturally for a given target, the signal would be only approximately one fourth as great as under the previously assumed conditions, but partially to compensate for this decrease in signal amplitude the signal would be received through twice as long an interval of time, and thus the total energy received by the apparatus would be reduced by only one-half.

In a simple exemplary form, the detecting apparatus, shown in Fig. 2, comprises four bolometer elements designated AG, BG, BC and AC. These elements, hereinafter to be described in detail, are suitably mounted on a support 38 in such manner as to have their radiation sensitive surfaces spaced from the reflecting surface 40 of a mirror 42 at a distance approximately equal to the focal length of the mirror. The reflecting surface 40 is preferably spherically concave, although it may be parabolic in some cases without great loss in efficiency.

The mirror 42 is suitably secured within a generally frusto-conical housing 44, the inner surfaces of which are preferably dull black. The housing 44 has a circular opening 46 and is provided with a flange 48 by means of which the housing may be suitably secured in the plane, so as to have its opening 46 in direct communication with the atmosphere. The support 38 is preferably made in the form of a spider having at least one hollow arm to form a conduit for electrically insulated conductors A, B, C and G leading to the bolometer elements. The arms of the spider 38 are preferably made of as small cross-section as possible so as to obstruct a minimum of radiation from the mirror surface 40. The conductors A, B, C, and G are connected to the bolometer elements AG, BG, BC and AC in the manner indicated in Fig. 7. The bolometer may be of any suitable highly sensitive type. A Hayes cell or a photoelectric cell may be used in place of the bolometer elements under certain conditions.

One preferred form of the bolometer is, however, shown in Figs. 3 to 6, and comprises a strip 50 of bimetal consisting of a layer of platinum 51 and a layer of base metal 52 shown to greatly enlarged and to an exaggerated scale in Fig. 4. The strip itself may have a thickness in the order of .001″, and the platinum layer may have a thickness in the order of 0.00001″.

It will be understood that a layer of platinum of this thickness is so filmlike and fragile that it would not be feasible to form it or handle it in any way. However, since it is bonded to the base metal 52, of nickel, or the like, and is thus effectively integral therewith, the strip may be readily formed and machined to the desired shape. The strip 50 may first have a plurality of thin slits 54 milled or otherwise formed therein, these slits being preferably made very narrow. The slits 54 extend transversely of the strip 50, but are alternately staggered as shown in Fig. 3.

After the slits 54 have been cut in the strip, it is bent at right angles along the dotted lines 55, 56 to assume the channel-like form shown in Fig. 5. It is then placed over a block 58 of insulating material such as Bakelite. The block 58 has a shallow recess 59 formed in its upper surface and extending longitudinally of the block, thus providing a pair of supporting beads 60 along its upper longitudinal edges. The downwardly bent portions of the strip are clamped against the sides of the block 58 by a pair of clamping bars 62, 63 which extend beyond the ends of the strip 50, and are secured to the block 58 by screws 64 which are threaded in the block 58, the heads of the screws 58 being countersunk into the clamping bars 62, 63.

Sheets 66 of mica or similar insulating material prevent electrical contact between the downwardly bent portions of the strip 50 and the clamping bars 62, 63. The clamping bars 62, 63 have slots 68 extending longitudinally thereof beyond the ends of the strip 50. After the strip 50 has thus been clamped to the block 58, the edges of the strip are severed from the central portion thereof by cutting a slot along the dotted lines 69 and 70 (Fig. 3). This operation will be performed by means of a milling cutter or by means of a similar tool operating through the slots 68. When these cuts along the lines 69, 70 have been taken, the effective portion of the strip comprises a single grid which may have lugs 72 for making electrical connections soldered or otherwise secured to the ends thereof.

After the strip 50 has thus been clamped to the flange 59 and completely formed to its finished grid-like shape, and after the connecting lugs have been secured thereto, an acid resisting coating is applied to all exposed portions of the strip and metallic parts of the assembly, with the exception of those portions of the strip lying between the points 74 and 75. Acid is then applied to the portion of the strip remaining exposed, the acid being such as will etch away the base 52 but will not affect the platinum layer 51.

As a result of the above process, the main portion of the grid consists of a very thin layer of platinum which is rigidly and firmly supported by the portions of the base 52 which are protected by the acid resisting coating. After these steps have been performed the assembly of the block 58, clamping bars 62, 63, the grid formed strip 50 and associated parts are placed in a metal distilling apparatus and coated with a metallic black such as bismuth black or zinc black. The metallic black coating should be made no thicker than necessary to give the platinum a dull black appearance.

After the platinum has thus been treated it is covered by a pane 76 which is preferably cut from a sodium chloride crystal and is of sufficient thickness fully to protect the platinum grid from damage by wind, but which is not of sufficient thickness materially to interfere with the transmission of infrared radiation. The pane 76 fits in suitable rabbets formed in the upper edges of the clamping bars 62, 63 and is held in place by a frame 78 which is secured to the block 58 by screws 80.

The frame 78 has beveled inner reflecting surfaces 82 which reflect a large proportion of the radiant energy falling thereon toward the sensitive portion of the bolometer grid. Incidental to the assembly of the parts of the bolometer and after its assembly has been completed, all cracks and joints are sealed with a suitable compound such as a wax mixture, so that the platinum grid of the bolometer is shielded against moisture and other deleterious gases which may be present in the atmosphere. The bolometer elements are preferably provided with suitable caps or a cover by which the salt crystal 76 may be protected against moisture when the apparatus is not in use.

The bolometer elements may be secured to the supporting spider 38 by screws 84 (Fig. 2) threaded in the Bakelite blocks 58.

The housing 44 is preferably so mounted in the airplane that it may be rotated about its axis through an angle sufficient to compensate for the drift of the plane when it is flying crosswind, so that the horizontal axes of the bolometer elements may be maintained perpendicular to the line of flight.

Instead of arranging the bolometer elements as shown in Figs. 2 and 7 with the result of producing a signal wave form of the type shown in Fig. 8, they may be arranged in the manner illustrated in Fig. 9, wherein it will be noted that the elements are arranged in two longitudinal lines spaced apart a distance approximating their widths. The connections to the bolometer elements are made in such manner that if a target is scanned by the two right hand elements (referring to their position relative to the airplane), two positive signal peaks will be generated as exemplified by the full line curve of Fig. 10, whereas if the left hand elements AC and BG scan the target, two negative signal impulses will be produced in the manner indicated by the dotted curve of Fig. 10.

By providing suitable apparatus by which the operator may ascertain whether the signal impulse is of a positive or of a negative nature, the operator may determine whether the target is to the right or left of a vertical plane passing through the longitudinal axis of the airplane. The disadvantage of this arrangement of the bolometer elements is that if the plane passes directly over the target there is a possibility that both the positive and the negative signal producing elements will be affected to an equal extent, so that they will cancel each other and will not produce a signal.

A further possible arrangement of the bolometer elements is illustrated in Fig. 11, wherein they are shown as placed in a single line with the two positive signal producing elements on the right hand side, and the two negative producing elements on the left hand side. If this arrangement is utilized, it will be apparent that but one signal impulse will be produced upon the scanning of a target, but that the width of the field scanned (corresponding to the dimension W of Fig. 1) is greatly extended. The arrangement of Fig. 11, like the arrangement of Fig. 9, has the disadvantage mentioned above in that it is possible that no signal will be produced if the plane passes directly above the target so that the elements BG and BC are energized to the same extent.

In the foregoing description it has been assumed that some means was provided for detecting changes in the resistances of the bolometer grid elements resulting from heating or cooling the latter, due to the presence in the field scanned of an object or target which was at an average temperature higher or lower than that of the surface of the surrounding water. While there are a variety of electrical circuits which might possibly be used for detecting such variations in the resistances of the bolometer grid elements, it is an important requirement that the electrical circuit be of the highest possible degree of sensitivity, since a lack of sensitivity in the electrical portion of the apparatus could, if at all, be compensated only by increasing the size of the reflector 40, or by increasing the sensitivity of the bolometer. There are practical limitations in the size of the radiation reflecting mirror, and the effect of increasing the size of the mirror is not as advantageous as might be expected, since theoretical considerations show that the sensitivity increase due to an increase in the size of the mirror varies not as the area of the mirror, but instead, only as the diameter.

Since the usefulness of the apparatus is dependent partly upon the smallness of temperature differences between the target and the surface water which the apparatus can detect, and since it is preferable to have the apparatus of such sensitivity that the airplane may fly at a very high altitude and therefore scan a strip of the surface of the water of great width, it will be apparent that it is of great importance that the electrical circuit by which the resistance variations of the bolometer elements are detected be of the highest possible sensitivity.

As previously indicated, there are limitations upon the degree of amplification which may be obtained by customary electron discharge device amplifier circuits, since there is always present in such circuits a certain amount of electrical disturbance or background noise, the level of which determines the minimum amplitude of an electrical signal which can be differentiated from the background noise, and thus be utilized to transmit intelligence. In apparatus of the character here described, this problem of background noise is rendered more difficult of solution because all of the variations in the resistances of the bolometer elements do not necessarily originate from the scanning of the target, but may result from atmospheric temperature changes, vibration, and possibly other factors.

A detecting circuit which is very selective as to the signals produced by the scanning of a target and is very insensitive to electrical disturbances which may originate in the bolometers or in the amplifying circuit, is diagrammatically illustrated in Fig. 12. In this circuit a generator 90 of a carrier frequency of for example 4000 C. P. S., has a resonant output circuit including a primary winding L1 of a transformer T1, the primary winding being in parallel with a condenser C1. The ends of the secondary winding L2 are connected respectively with the input terminals A and B of a resistance bridge, the output terminals being designated C and G respectively. In this figure the legs of the bridge are illustrated as comprising the bolometer grid elements AC, AG, CB and BG connected to the terminals of corresponding letters.

A signal in the order of 3.5 volts is impressed across the input terminals A, B, and, if the bridge is in perfect balance, no signal will appear across the terminals C, G. In the operation of the circuit it is desired that a certain amount of the signal appear across the output terminals C, G, but the amount of such signal should represent but a certain small percentage of the input voltage, in the order of 1%, or less.

To obtain this small output signal, the bridge is first balanced by operating a switch 92 to connect a variable condenser C2 either to the terminal A or to the terminal B, as may be indicated by the direction of capacitance unbalance of the bridge. The condenser C2 then may be adjusted manually so as accurately to compensate for any difference in the capacity of the legs of the bridge. Ordinarily the bolometer elements will not exhibit any appreciable capacity, the only capacity being the distributed capacity of the bolometer elements and of the conductors connected thereto.

Having balanced the bridge capacitively, it is next balanced resistively by operating a switch 94 to connect a conductor 95 either to the terminal A or to the terminal B of the bridge. Resistors R1, R2 and R3 are connected in parallel between the conductor 95 and a grounded conductor 96, the resistances R1 and R2 being adjustable. The value of R1 is small relative to the value of R2, so that adjustment of the resistance R1 constitutes a course adjustment, and the resistor R2 constitutes a fine adjustment for the value of the resistance between the conductors 95 and 96.

The resistor R3 is temperature responsive and is positioned in heat conducting relationship with a heating resistance R4, the current flow from a current source represented as a battery 98, being controlled by an adjustable resistor R5. Adjustment of the resistor R5 constitutes a means for causing extremely minute variations in resistance in the resistor R3, and thus makes it possible to bring the bridge exactly in balance. Such exact balance will be indicated by a zero reading in the milliammeter 100 (.1 ma. full scale) as will hereinafter appear. Having obtained an exact balance, the bridge is then unbalanced a predetermined amount, in the order of 1%, by adjustment of the resistors R1, R2 and R3.

The output terminals C and G of the bridge are connected to the primary winding L3 of a transformer T2. The secondary winding L4 of this transformer has its terminals connected to a condenser C3 which, with the inductance L4, forms a resonant mesh tuned to the frequency of the generator 90 of, for example, 4000 C. P. S.

An amplifying pentode 102 has its control grid connected to one terminal of the secondary winding L4 through a biasing battery 103, the cathode and suppressor grid of the tube 102 being connected to ground. The screen grid is connected to a source of suitable direct current potential indicated as +90 v., while the plate is connected to a B current supply through a plate resistor R6, the plate supply being indicated as +180 v.

The output of the tube 102 is transmitted through a blocking condenser C4 to the grid of a pentode 104. The tube 104 acts as a fixed bias detector, the bias being provided by a battery 106 having its positive terminal connected to ground and its —27 v. terminal connected through a resistor R7 to the control grid 107 of the tube 104. The screen grid is connected to a suitable direct current potential source indicated as +22 v., and the suppressor grid is connected to the cathode. The plate 108 of the tube 104 is connected to a suitable direct current plate supply indicated as +B through a plate resistor R8 and the milliammeter 100.

A condenser C5 of relatively large value is connected between the plate 108 and ground. The resistor R8 is of relatively high value so that when the tube 104 is rendered conducting, the plate current will be initially supplied at the expense of the charge on the condenser C5. The condenser C5 together with the resistance R8 thus constitutes, in effect, a low pass filter.

A condenser C6 is adapted to be connected in parallel with the condenser C5 upon operation of a switch 110 when it is desired to tune the condenser C5 to a lower frequency. A condenser C7 connects the plate 108 to an adjustable resistor R9, a condenser C8 being adapted to be connected in parallel with the condenser C7 upon operation of a switch 111. The condenser C7 together with the resistor R9 form a filtering mesh effective to cut off very low frequencies. Thus, the condenser C5, resistor R8, condenser C7 and resistor R9 together form in effect a filtering mesh most responsive to the desired frequency of .264 C. P. S.

A signal taken from the potentiometer resistance R9 is impressed upon the grid of an amplifying triode 114 through a biasing battery 115. Plate current is supplied to the plate 116 of the tube 114 through a resistor R10 connected to a suitable direct current source indicated as +B. The plate 116 is also connected through a resistor R11 to one terminal of a condenser C10 (corresponding to the condenser C5) the other terminal of the condenser C10 being connected to ground. A condenser C11 is adapted to be connected in parallel with the condenser C10 by the operation of a switch 112. A condenser C12 is likewise connected to the resistor R11 and to a potentiometer resistance R12.

The operation of a switch 113 is adapted to connect a condenser C13 in parallel with the condenser C12. The adjustable tap of the potentiometer R12 is connected through a biasing battery 118 with the grid of a triode 120.

The resistors R10, R11 and R12 together with the condensers C10 and C13 form a mesh which is selectively responsive to the desired frequency of .264 C. P. S., and thus the only signals impressed upon the grid of the amplifier tube 120 will be such as are at .264 C. P. S. or close thereto. The selectivity of the circuit could, of course, be increased enormously by adding additional stages of resistance-capacity filtering meshes and amplifier tubes.

The plate 121 of the tube 120 is connected through a load resistor R13 and a milliammeter 122 to a plate current source indicated at +B.

Assuming that the bridge circuit has been balanced so that the milliammeter 100 indicates zero, and that thereafter it has been unbalanced to an extent approximately 1%, the milliammeter 100 will indicate this degree of unbalance. When, however, any greater unbalance of the bridge results from the fact that a target has been scanned, such greater fluctuations will cause an appreciable change in the plate current through the detector tube 104, and as a result, there will be a sufficient change in the voltage on the grid of the tube 114 to be transmitted through the tubes 114 and 120, because the filtering meshes preceding these tubes will pass the impulse generated by the scanning of the target, since this impulse will be at .264 C. P. S.

The resonance curve of the combined filtering meshes will be reasonably sharp. As a result, current will flow through the tube 120 only when the unbalance of the bridge takes place at a frequency of approximately .264 C. P. S.

The milliammeter 122 will thus not register an unbalance of the bridge caused by the scanning of a cloud or caused by variations in the temperature of the water which do not occur at intervals of approximately 500 feet. The milliammeter 100, by the direction of the deflection of its needle, indicates whether the unbalance of the bridge is in a positive or negative direction, and is thus particularly useful when the circuit is used in connection with bolometer arrangements such as are shown in Figs. 9 and 11. Thus, by observing the milliammeters 100 and 122, the operator of the apparatus will attain an indication when a target is scanned, and also will be able to ascertain whether the target is to the right or left of the vertical plane through the longitudinal axis of the airplane, if the bolometer elements are arranged to provide such indication. The milliammeters 100 and 122 are representative of any suitable current flow indicating means, and may be in the form of relays to operate various other indicating apparatus or controls.

Another apparatus for and method of scanning is shown in Figs. 13 to 19. In this scanning system, the field scanned is indicated by the large circle 130 shown in Fig. 14, while areas scanned at particular instants are indicated by the dotted circles 132. The central circle 134 indicates an area which is not scanned.

In actual practice, the axis relative to the surface of the water at which the scanning takes place will be in the order of 45° to 60°, so that upon the surface of the water the scanned areas would be in the form of ellipses constituting the projections of the areas included in the circles 130 and 132. The apparatus whereby such circular scanning may be effected is shown in Fig. 13, and consists of a suitable frame 136 upon which a platform 138 is suitably mounted as by a rubber cushion mounting to insulate the platform 138 from the vibration of the airplane, and likewise to damp any vibration which may result from the operation of the apparatus mounted on the platform.

A concave mirror 140 having a reflecting surface 141 is suitably secured to the end of a shaft 142 with the optical axis of the mirror at a slight angle with respect to the axis of the shaft, with the result that as the mirror is rotated it will scan the annular area between the circles 130 and 134 of Fig. 14.

Suitable balancing weights 144 are secured to the hub of the mirror 140, these weights being adjusted, as to mass and position, to cause the mirror to rotate smoothly. The shaft 142 is mounted for free rotation in a bearing sleeve 146, suitable thrust bearings 148 and 150 being provided to prevent endwise movement of the shaft 142 relative to the bearing sleeve 146. The bearing sleeve 146 is suitably mounted in a pair of supporting standards 152 and 153, suitable vibration insulating bushings 154, 156 being provided to damp vibration of the bearing sleeve 146. The standards 152 and 153 are secured to the platform 138. An insulating plate 158 is secured to the bearing sleeve 146 and is thus stationary and carries a plurality of commutator segments 160.

A slip ring disc 162 is suitably secured to the shaft 142 but insulated therefrom, and carries a brush 164 cooperable with the commutator segments 160. A brush 166 is carried by a post 168 and conducts current to the slip ring 162 and brush 164. The shaft 142 is connected by a flexible coupling 170 with the armature shaft 172 of a motor 174 which is mounted on the platform 138. For purposes of illustration, the motor may be a synchronous motor operating at 1800 R. P. M., or 30 revolutions per second.

Radiation is admitted to the mirror through a circular opening 176 formed in a boxlike enclosure 178 in front of the mirror, the inner surfaces of the enclosure 178 preferably being painted black. A radiation responsive cell 180 is suitably supported from the frame 136 by a plurality of brackets 182, some of which may be hollow to form conduits for the wires leading to the cell 180. As previously indicated, the cell 180 may be in the form of a bolometer, a Hayes cell, or may, in some instances, be a photoelectric cell. In order to shorten the grid lead, the cell 180 may have the first stage of amplification mounted directly in the cell housing.

The sensitive surface of the cell 180 is located at a distance from the mirror corresponding to the focal length thereof, and the sensitive area is of such size that the focus of the mirror would, at all times, lie within the sensitive area even though the optical center line of the mirror is at an angle in the order of 5° relative to its axis of rotation. Thus, as the mirror rotates, it progressively scans the areas represented by the circles 132. While of course scanning of the annular area between the circles 130 and 134 is continuous, the areas scanned at six equally spaced instants of time are indicated in Fig. 14 by the Roman numerals I to VI, the commutator segments 160 being similarly designated with Roman numerals.

The electrical circuit employed with the apparatus of Figs. 13 and 14 is shown in Fig. 16, from which it will appear that the voltage or resistance changes generated in the cell 180 due to changes in intensity of radiation received thereby, are amplified by an amplifier 183.

The output of the amplifier 183 is connected through a very high impedance, shown as a resistance $R14$, to a series of filtering meshes which shunt the output to ground. These filtering meshes comprise inductance and capacity meshes consisting of inductances $L6$, $L7$ and $L8$ in parallel respectively with condensers $C14$, $C15$ and $C16$. The filtering section $L6$, $C14$ is made to resonate at the second harmonic of the frequency of rotation of the mirror. Upon the assumption that the mirror is rotated at a speed of 30 revolutions per second, the inductance $L6$ and $C14$ would be made of such value as to have a resonant frequency of 60 C. P. S. The filter section $L7$, $C15$ would be chosen to resonate at a frequency of 90 C. P. S., i. e., the frequency of the third harmonic of the frequency of rotation of the mirror, and the filter section $L8$, $C16$ would be chosen to resonate at 120 C. P. S., i. e., the fourth harmonic of the frequency of rotation of the mirror.

This series of filter sections has the peculiar property that it offers a very high impedance only for a signal of 30 C. P. S. containing a large part of its energy in its second, third and fourth harmonic components. The mesh does not offer any appreciable impedance to a sine wave at the fundamental frequency (30 cycles), but does afford substantial impedance to the harmonics of this sine wave. The purpose and function of this filtering arrangement will be described in greater detail hereinafter.

The output of the amplifier 183, as modified by this filtering mesh, is supplied to an amplifier 186, the output of which is supplied through a suitable condenser $C17$ to the grid 188 of an amplifying pentode 190. The bias on the grid of the tube 190 is supplied through a grid resistor $R15$ from a suitable source of adjustable bias voltage indicated as a battery 192 connected to a potentiometer $R16$. The adjustable tap on the potentiometer $R16$ may be moved to such position that the tube 190 is biased beyond cutoff and therefore a substantial positive swing of the potential on its grid 188 will be required to cause the tube 190 to conduct the plate current.

A small condenser $C18$ may be provided to connect the plate 194 of tube 190 to ground. The plate 194 is connected to the commutator brush 164 and as this brush is rotated to successively make contact with the commutator segments 160, it connects the plate 194 to one of the condensers $C21$ to $C26$, which are respectively connected between ground and the commutator segments 160 numbered I to VI. These condensers C21 to C26 are normally in charged condition, being connected through resistors R21 to R26 respectively, and milliammeters 201 to 206 respectively, to a source of plate current indicated as a terminal +B.

Thus, when any one of the condensers C21 to C26 is discharged through the tube 190, due to the fact that a sufficiently high positive signal has been impressed upon the grid 188, its associated charging circuit through the associated resistor R21 to R26 and milliammeter 201 to 206 will recharge the condenser. Such recharging will be indicated by deflection of the pointer of the particular milliammeter in the charging circuit. In this way, the operator of the apparatus will obtain an indication of the location of the target, i. e., in which one of the six sectors I to VI the target is located.

As the mirror rotates and scans the surface of the sea, it will, assuming that the apparatus as a whole is directed at an angle to the surface of the water, be affected by radiation from different angles, and the cell 180 will therefore very likely generate a sine wave signal of the frequency of rotation of the mirror. At the same time, a target passing in the annular field scanned will likewise result in the generation of a signal at the frequency of rotation of the mirror, but the signal generated by the target will not be of sine wave form, since the impulse will occur only during a small part of the cycle. The voltage wave generated in the cell 180 therefore may have a shape similar to that shown in Fig. 17, wherein the sine wave resulting merely from the rotation of the mirror over the surface of the water has superimposed upon it an impulse peak due to the presence of a target in sector III.

Due to the use of the filtering sections L6—C14, L7—C15, and L8—C16, the signal supplied to the amplifier 186 will have its 30 cycle sine wave suppressed, and the input wave will be distorted to the shape shown in Fig. 18 which has a high peak in the sector III. The wave of the shape shown in Fig. 18 is amplified by the amplifier 186 and impressed upon the grid 188 of the tube 190. The tube 190 is biased sufficiently beyond cutoff by adjustment of the bias controlling potentiometer R16 that only the highest positive peaks of the wave of Fig. 18 are effective to render the tube conducting. As a result the plate current through tube 190 will have a wave shape as shown in Fig. 19.

The milliammeters 201 to 206 are intended as illustrative of any suitable indicating device or as relays operable to control various other circuits. For example, in using the invention as a control apparatus for an automatically steered aerial torpedo, relays would be substituted for the milliameters 201 to 206, and these would, through an automatic gyroscopic pilot, cause operation of the pneumatic or other controls to operate the aerodynamic controls of the torpedo. The torpedo could be in the form of a small airplane and be provided with the usual airplane flight direction controlling surfaces such as ailerons, elevator and rudder. The torpedo would be carried in the usual manner by the airplane. The airplane would be equipped with a scanning apparatus similar to that shown in Figs. 13 to 16, and the torpedo would likewise be equipped with such apparatus.

When the operator of the apparatus notes that a target is in the field scanned by the apparatus in the airplane, he releases the torpedo. Incidental to the release of the torpedo, gyroscopic steering apparatus in the torpedo would be set into operation so as to provide the torpedo with a reference course corresponding exactly to that of the plane.

After time had been allowed for this gyroscopic apparatus to come into operation, the torpedo would be freed from its connection with the airplane and permitted to glide downwardly toward the target. The steering apparatus for the torpedo would preferably be so adjusted that immediately upon being freed from the airplane the torpedo would glide at a relatively steep angle along the same azimuthal course as the plane had at the instant of release of the torpedo, and after a short interval the aerodynamic controls of the torpedo would be operated to decrease the angle of the glide until the target appeared within the field of view of this scanning apparatus.

Under the above circumstances, the target would probably first appear in sectors I or VI, and as a result, the signal emanating from these sectors would operate the aerodynamic controls of the torpedo and would be adjusted in a gradual manner until the target appeared in the unscanned zone 134 at the center of the annular scanned field. As long as the target remained in this central zone indicated by the circle 134 in Fig. 14, the steering controls of the torpedo would remain in fixed position. However, if, due to the fact that the target was moving or due to the fact that the direction and angle of glide was disturbed by atmospheric conditions so that the target again appeared in one of the scanned sectors I to VI, suitable steering controls would again be operated to correct the direction or angle of glide, or both. Such correction would preferably be made to an extent only partially to correct for the deviation in course with respect to the target, so as to avoid a "hunting" effect in the steering controls.

The axis of the shaft 142 of the scanning apparatus in the torpedo may be at a slight vertical angle relative to the line of glide of the torpedo, so that the torpedo will tend to strike the target below the center of the target, and by virtue of such arrangement, the torpedo may be made to strike the water a short distance before it reaches a target such as a battleship. The explosion timing mechanism of the torpedo may be so arranged that it will commence its timing operation when the torpedo hits the water, and if the wings and aerial control surface of the torpedo are made sufficiently frangible, these may be severed from the body of the torpedo upon its striking the water, and the body of the torpedo may continue through the water until it reaches the side of the ship at a vulnerable depth.

Since it is very difficult to avoid having the temperature of the deck and superstructure of the ship slightly different than that of the surrounding water, it would be difficult for a ship to avoid being struck by the torpedo. The airplane from which the torpedo is released may fly at sufficient altitude to be out of the effective range of anti-aircraft batteries on the ship. Since visibility of the target is not essential, if the detecting cell is responsive to infrared radiation (as distinguished from the photoelectric cell), the airplane may safely release the torpedo at night or at other times when visibility is poor, provided of course that the condensed moisture or other visibility hindering medium is not sufficiently dense to cut off the infrared radiation from the target. The automatic dirigible torpedo thus provides a very effective defense weapon against hostile naval craft.

Figure 20:
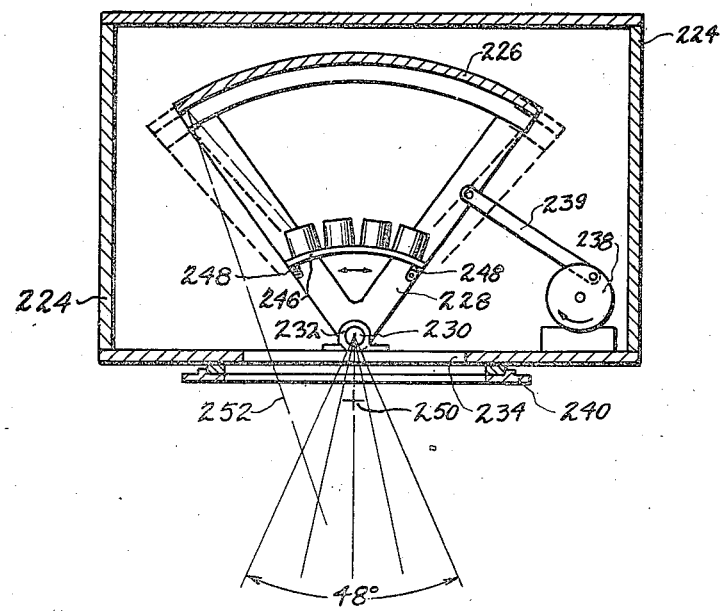
Figure 20 is a central vertical sectional view of a modified form of scanning apparatus.
Figure 21:
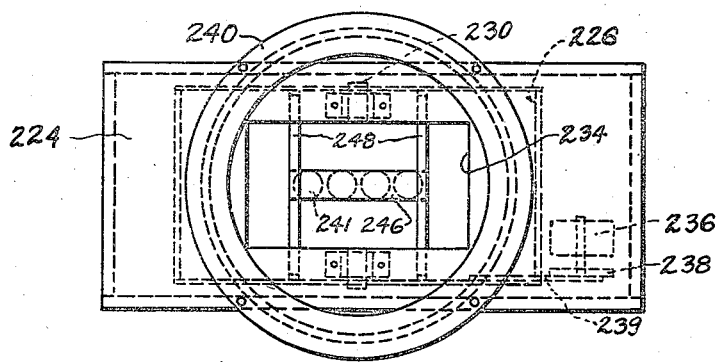
Figure 21 is a bottom plan view of the apparatus shown in Fig. 20.
Figure 22:
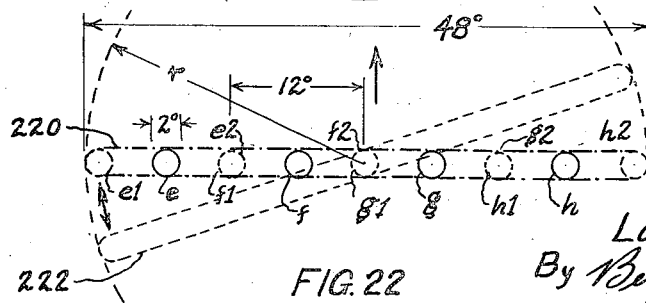
Figure 22 is a diagram illustrating the method of scanning employed by the apparatus of Figs. 20 and 21.

The scanning apparatus shown in Figs. 20 and 21 is adapted to scan a relatively long narrow strip such as the area enclosed by the dot-dash line 220 in Fig. 22. Four circular areas *e*, *f*, *g* and *h* are adapted to be simultaneously scanned at any given instant. These small circular areas may have a diameter of such size as will subtend an angle in the order of 2° at the scanning apparatus. The apparatus is such that each of the circular areas scanned is oscillated through an angle in the order of 12° so that the length of the generally rectangular area scanned will subtend an angle in the order of 48° at the scanning apparatus.

The scanning apparatus oscillates together so that the circular areas scanned will, in the diagram of Fig. 22, oscillate between the positions indicated by the dotted circles *e*1, *f*1, *g*1, *h*1 and *e*2, *f*2, *g*2 and *h*2 respectively. It will be noted that the areas traversed by the scanning circles *e* and *f* overlap, and similarly, the areas traversed by the scanning circles *f* and *g* overlap, and the areas traversed by the scanning circles *g* and *h* overlap. Thus, there is no "dead" spot throughout the length of the complete area scanned.

The areas *e* and *f* may have radiation therefrom directed to bolometer elements producing a negative signal, while the areas *g* and *h* may have radiation therefrom directed to bolometer elements producing a positive signal. In this way the apparatus may be made to provide an indication of whether a target traversed by the scanned area is to the right or the left of the course of the airplane carrying the scanning apparatus.

In addition, the scanning apparatus is preferably so mounted that the generally rectangular scanned area within the dot-dash line 220 may be oscillated relative to the course of the plane. Assuming the course of the plane to be in the direction indicated by the arrow in Fig. 22, the scanning apparatus may be arranged to effect a swinging of the scanned area using the center of the scanned area as the axis of such swinging movement, or using one end of the scanned area as a pivot for such swinging movement. Assuming that the scanning apparatus may be oscillated about its median optical axis when the apparatus is in the position to scan the areas *e*, *f*, *g* and *h*, the generally rectangular areas scanned could be swung through an arc of preferably not more than 90° so as to be capable of scanning a total area of radius *r* as suggested by the displacement of the generally rectangular area indicated by the rectangle 222.

In this manner, the operator of the scanning apparatus may rescan a target merely by oscillating the apparatus about its optical axis, and by proper manipulation, and by the use of well known triangulation methods, may determine the exact position of the target. A suitable apparatus for scanning in accordance with the method above described and diagrammatically illustrated in Fig. 22 is shown in Figs. 20 and 21, and comprises a housing 224 in which a spherical mirror 226 is mounted. The mirror 226 is attached to a pair of side frames 228 which have sidewardly projecting trunnions 230 mounted for free rotation in bearings 232.

The mirror 226 is in the shape of a right projection of a rectangle upon a sphere, the rectangular shape being apparent from Fig. 21. The inside of the housing 224 is preferably finished dull black so that the only rays capable of striking the reflecting surface of the mirror are those entering through a rectangular opening 234 formed in the bottom of the housing. The mirror is adapted to be oscillated by a motor 236 which, through a crank disc 238 and connecting rod 239, is connected to one of the side frames 228. In accordance with the system of scanning described with reference to Fig. 22, the mirror is oscillated through an angle of 12°. The housing 224 is mounted for free rotation through an angle of at least 90° upon a supporting ring 240. Suitable stops may be provided to limit the rotational movement of the housing 224 relative to the supporting bearing ring 240 to the angular extent desired.

Four radiation sensitive cells 241, 242, 243 and 244 are suitably secured to a supporting strip 246 carried by a pair of cross pieces 248, the ends of which are attached to the side frames 228. The radiation sensitive surfaces of the cells 241 to 244 are spaced from the surface of the mirror 226 a distance equal to the focal length of the mirror, it being observed that the approximate center of curvature of the mirror surface is at the point 250 indicated in Fig. 20. A typical ray 252 of light or infra-red radiation is shown to illustrate the functioning of the optical system.

By the use of the apparatus shown in Figs. 20 and 21, the scanning method described with reference to the diagram of Fig. 22 is readily performed. This scanning system has the pronounced advantage that the angular field scanned at any instant by a single one of these cells may be relatively small (2° included angle), but that the four cells while oscillating together very effectively scan a strip subtending an angle of 48° at the scanning apparatus.

The mirror may, within reasonable limits, be oscillated at any desired speed so that the electrical system for detecting resistance or voltage changes in the cells 241 to 244 may be made to secure optimum performance, and the speed of oscillation of the mirror made to correspond to the frequency at which the electrical system is most sensitive.

As above mentioned, the fact that the scanning apparatus as a whole may be rotated about its median optical axis makes it possible to scan a very large area from a single point of observation, the only limitation being that the scanning apparatus must not be rotated at a higher speed than 2° per cycle of oscillation of the mirror, in order to insure the scanning of a target which lies near the ends of the generally rectangular area which is scanned. To prevent too rapid rotation of the housing 224 on its bearing ring 240, a suitable speed governing mechanism may be provided for limiting the speed to this maximum allowable speed.

The apparatus of Figs. 20 and 21 may have an electrical circuit like that shown in Fig. 12, except that the constants of the elements of the frequency discriminative meshes or filters will, of course, be selected to pass signals of a frequency depending on the frequency of oscillation of the mirror, and under some circumstances a filtering mesh corresponding at least in principle to the filtering mesh of Fig. 16 may be employed in the electrical circuit of the apparatus. The apparatus may be made of relatively small size, a mirror size in the order of 7" x 13" being indicated as a practical size.

Figure 24:
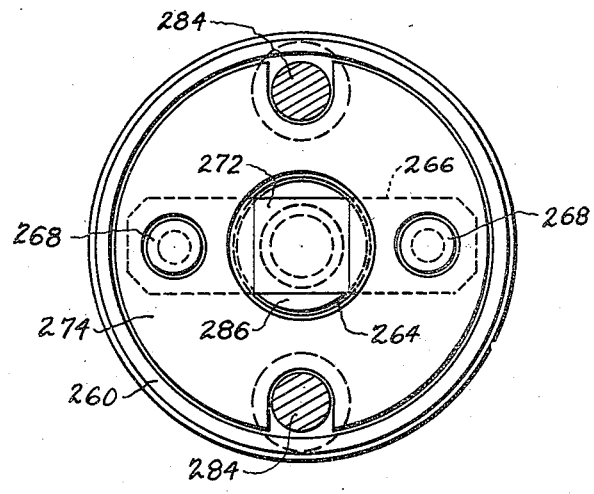
Figure 24 is a transverse sectional view taken on the line 24—24 of Fig. 23.
Figure 23:
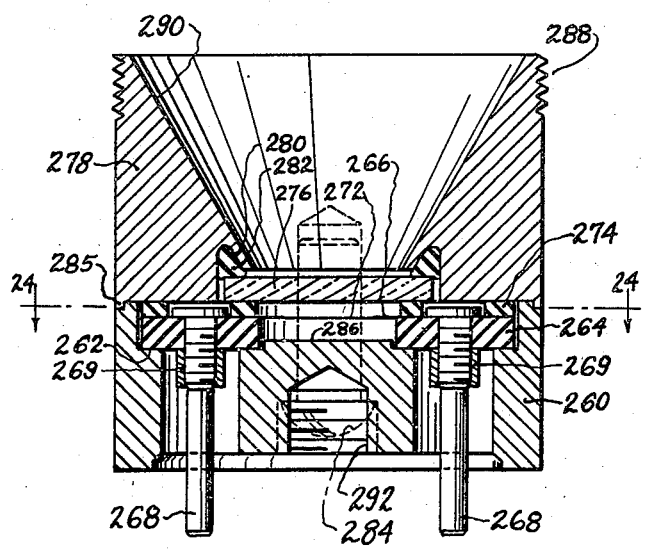
Figure 23 is a central longitudinal sectional view of the modified form of of bolometer.

Because of the high degree of sensitivity of the electrical circuit which may be used with an apparatus of this character, the cells 241 to 244 may, when infrared radiation is to be detected, be made very small and compact. A cell of this character is shown in Figs. 23 and 24, which shows the cell to a scale several times normal size.

The cell comprises a body 260 having an annular recess 262 adapted to receive a ring 264 of insulating material. A generally rectangular strip 266 of platinum bimetal is secured to the ring 264 by a pair of bolts 268 provided with nuts 269. In making the cell the platinum bimetal strip is attached to the ring 264 by means of these bolts and thereafter, by a process similar to that described with reference to the method of making the bolometer of Figs. 5 and 6, a central rectangular portion 272 has the base metal etched therefrom, so as to leave an extremely thin film of platinum extending across the opening in the ring 264.

The platinum surface is then coated with a metallic black in a metal distilling apparatus as previously described, and the ring 260 having the bimetal strip bolted thereto is inserted in the body 260. A spacing ring 274 is placed over the top of the ring 264, the spacing ring 274 having apertures to receive the heads of the bolts 268, and a pane 276 preferably of sodium chloride crystal is placed over the opening in the spacing ring 274 and secured in place by a reflecting head 278. This head is provided with an annular groove 280 in which is located a ring 282 of relatively soft rubber or the like, which resiliently presses against the salt crystal pane 276 to hold it in place, and to seal the assembly. The head 278 is secured to the body 260 by a pair of screws 284 so as to form a rigid assembly.

The upper edge of the body 260 is preferably rabbeted to receive an annular bead 285 at the bottom surface of the head 278 so as accurately to locate these parts, and after the assembly is thus completed all joints or cracks through which atmospheric air could enter the chamber formed by the openings in the rings 262 and 264 are sealed with a suitable wax composition. The surface 286 at the top of the body 260 is preferably a highly polished reflecting surface so that any radiation passing by or through the light sensitive portion 272 of the bimetal strip will be reflected toward the inner surface of this strip. The ends of the bolts 268 serve as terminals to which the electrical conductors may be soldered or welded.

The upper end of the head 278 is provided with an external thread 288 over which a suitable sealing protecting cap may be threaded when the cell is not in use, so as to prevent deterioration of the salt crystal pane 276 by moisture of the atmosphere.

The frusto-conical surface 290 is highly polished and is at such an angle that it will reflect a large portion of the radiation impinging thereon toward the radiation sensitive surface 272 of the bimetal strip. The body 260 is provided with a central tapped hole 292 in its bottom to receive a bolt or stud by which the cell is attached to its support.

The cell shown in Figs. 23 and 24 is particularly adapted for use in the scanning apparatus of Figs. 20 and 21 or in the scanning apparatus of Figs. 13, 14 and 15, but it is also capable of general use in any type of apparatus in which an infrared radiation sensitive cell is required.

While I have shown and described numerous embodiments and variations of my invention, it will be apparent to those skilled in the art that the underlying principles of the various features of the invention may be utilized in a wide variety of different types and forms of apparatus, without departing from these underlying principles. I therefore desire, by the following claims, to include within the scope of my invention all such similar and modified forms of the apparatus disclosed, by which substantially the results of the invention may be obtained by substantially the same or equivalent means.

I claim:

1. In apparatus adapted to be carried in an airplane for locating the presence of radiant objects on a surface below, a cell responsive to radiations of light or heat, a mirror for ray concentration positioned to focus on said cell at any one instant the rays reaching it from only a small area of the surface below, means for causing said cell and mirror to scan said surface in a regular and repetitive manner at a cyclical frequency, an electrical amplifier system for receiving signals from said cell and for operating indicating devices, and frequency discriminating networks in said electrical system adapted to transmit with highest efficiency certain frequencies which are directly related to said cyclical frequency.

2. In a system of the class described for detecting a source of radiation, a cell element responsive to the radiation of said source and capable of causing an electrical signal upon receiving such radiation, a reflecting element for condensing and directing the radiation from said source upon said cell element, means for causing said source to be scanned by said elements cyclically at a predetermined frequency, and an electrical amplifying system connected to said cell element, said electrical system being selectively responsive to frequencies directly dependent upon said predetermined frequency.

3. In a system of the class described for detecting a source of infrared radiation, the combination of a concave reflector, a plurality of infrared ray responsive cells located in a line at a distance from said reflector corresponding to the focal length of the latter, means to oscillate said reflector in a regular cyclical manner about an axis perpendicular to said line of cells to cause said line of cells to scan an elongated area, and means to detect and amplify variations in the electrical characteristics of said cells due to changes in the amount of infrared radiation received thereby.

4. In a system of the class described for detecting a source of radiation, an element responsive to the radiation of said source, and means for condensing the radiation from said source and directing the radiation upon said element, said last named means including a rotating system to cause said element to scan an annular field.

5. In apparatus for locating the presence of objects radiating energy in the light and heat range, a cell responsive to radiations from such objects, a reflector for concentrating and focusing rays from such objects on said cell, said reflector having a relatively small field angle, means for relatively moving said cell and mirror in a cyclical manner at a predetermined frequency, an electrical amplifier system for receiving signals from said cell, and a frequency discriminating network in said system adapted to transmit with highest efficiency certain frequencies which are directly related to said cyclical frequency.

6. In a system of the class described for detecting a source of radiation, a cell element responsive to the radiation of said source and capable of causing an electrical signal upon receiving such radiation, an element for condensing and directing the radiation from said source upon said cell element, means for relatively moving said elements cyclically at a predetermined frequency, and an electrical system connected to said cell element, said electrical system being selectively responsive to frequencies directly dependent upon said predetermined frequency.

7. In a system of the class described for detecting a source of infrared radiation, the combination of a concave reflector, an infrared ray responsive cell located at a distance from said reflector corresponding to the focal length of the latter, means to oscillate said reflector at a predetermined frequency about an axis perpendicular to its optical axis, and means selectively responsive to multiples of said predetermined frequency to detect and amplify variations in the electrical characteristics of said cells due to changes in the amount of infrared radiation received thereby.

8. In a system of the class described for detecting a source of radiation, an element responsive to the radiation of said source, means for condensing the radiation from said source and directing the radiation upon said element, said means including a cyclically oscillating system to cause said element to scan an elongated field, and electrical means connected to said element and discriminative as to frequencies related to the frequency of oscillation of said system.

9. An infrared ray detecting apparatus comprising a concave reflecting surface, a plurality of elongated bolometer elements positioned side by side adjacent the focus of said reflecting surface, and signal producing means connected to said bolometer elements to cause successive electrical impulses as said reflector receives infrared radiation from a source sufficiently remote to direct the radiation successively to said bolometer elements upon relative motion of at least two of the following: the source, the reflector, the bolometer elements.

10. In an apparatus of the class described, the combination of a radiation responsive element capable of producing an electrical signal, rotary scanning means to direct radiation from a generally circular area to said element, commutating means operating in synchronism with said scanning means, a plurality of devices responsive to significant signals initiated by said radiation responsive element, said devices being connected to said commutating means, and means for transmitting significant signals from said element through said commutating means to said devices, whereby the angular position of a source of radiation in the circular area scanned will be indicated by said devices.

11. A radiation detecting apparatus comprising power operated oscillating means for scanning at a predetermined frequency an elongated field upon a surface to be scanned, said means producing an electrical signal upon scanning an area providing a substantial change in intensity of radiation, means to rotate said oscillating means about an axis effecting a change in the axis of oscillation, and frequency responsive electrical means attenuating frequencies other than those bearing a definite relation to said predetermined frequency.

12. A radiation detecting apparatus comprising oscillatory means for scanning an elongated field of a surface to be scanned, a motor for driving said oscillatory means at a relatively constant frequency, electrical means coupled to said scanning means and including means for suppressing signals received from said scanning means and of a frequency close to said constant frequency, and manually operable means for changing the axis of oscillation of said oscillatory means.

LAURENS HAMMOND.

REFERENCES CITED

The following references are of record in the file of this patent:

UNITED STATES PATENTS

| Number | Name | Date |
| --- | --- | --- |
| 1,303,105 | Murdock | May 6, 1919 |
| 2,237,193 | Mobsby | Apr. 1, 1941 |
| 1,984,112 | Buchholz | Dec. 11, 1934 |
| 1,099,199 | Parker | June 9, 1914 |
| 1,639,411 | Mechau | Aug. 16, 1927 |
| 2,008,793 | Nichols | July 23, 1935 |
| 1,542,937 | Hammond | June 23, 1925 |
| 1,158,967 | Bellingham | Nov. 2, 1915 |
| 1,343,393 | Hoffman | June 15, 1920 |
| 2,016,036 | Fitzgerald | Oct. 1, 1935 |
| 2,199,725 | Smith | Apr. 30, 1940 |

OTHER REFERENCES

Popular Science Monthly, July 1933, p. 42. (Copy in P. O. Libr.)

Certificate of Correction

Patent No. 2,423,885.  July 15, 1947.

LAURENS HAMMOND

Figure 25:
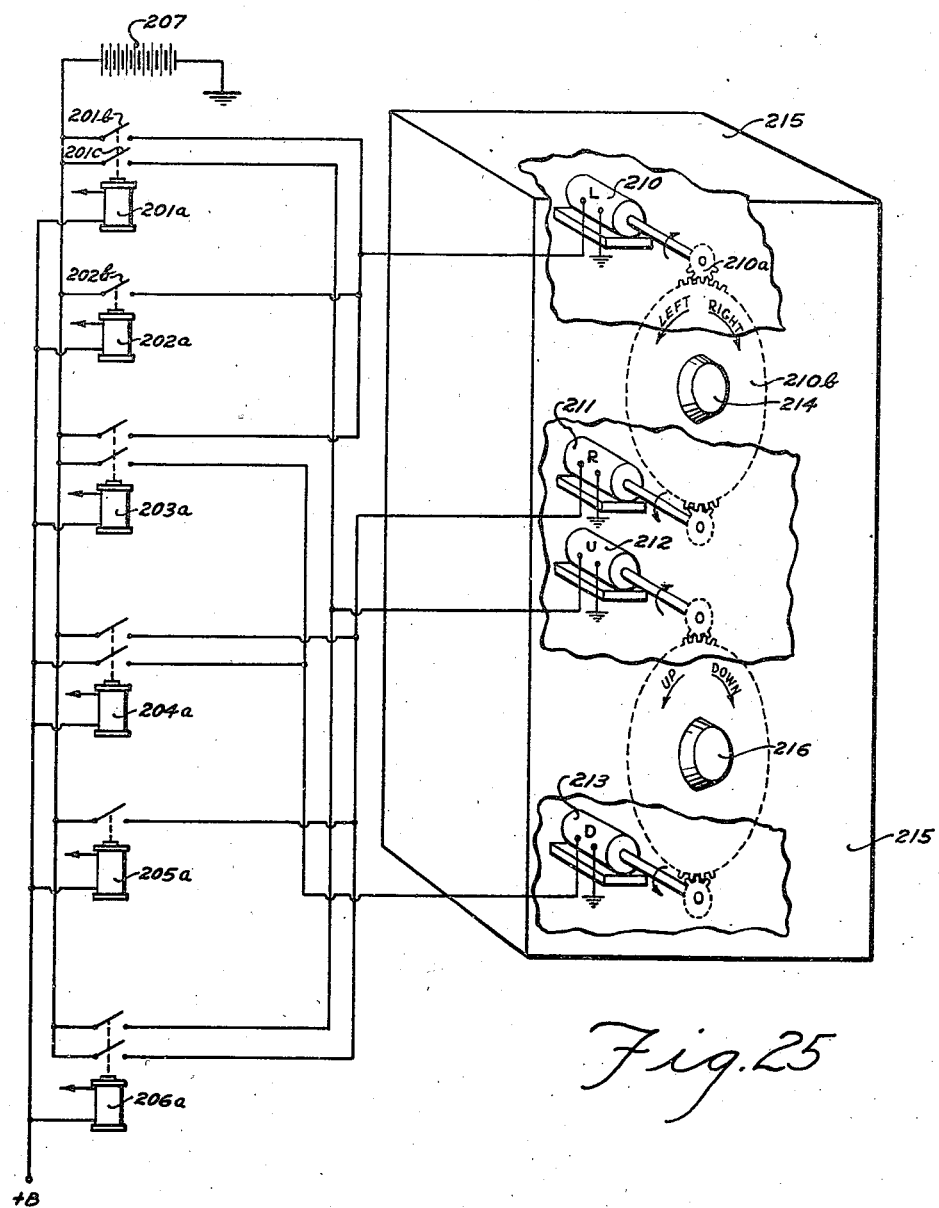

It is hereby certified that errors appear in the above numbered patent requiring correction as follows: In the drawings, strike out Fig. 25, comprising Sheet 6 thereof; in the heading to the drawings, Sheets 1 to 5 inclusive, for "6 Sheets" read *5 Sheets*; and that the said Letters Patent should be read with these corrections therein that the same may conform to the record of the case in the Patent Office.

Signed and sealed this 25th day of November, A. D. 1947.

[SEAL]

THOMAS F. MURPHY,
*Assistant Commissioner of Patents.*